(12) United States Patent
Hutter

(10) Patent No.: US 6,734,280 B1
(45) Date of Patent: May 11, 2004

(54) ROSIN-FATTY ACID VINYLIC POLYAMIDE POLYMER RESINS

(75) Inventor: G. Frederick Hutter, Charleston, SC (US)

(73) Assignee: MeadWestvaco Corporation, Stamford, CT (US)

( * ) Notice: Subject to any disclaimer, the term of this patent is extended or adjusted under 35 U.S.C. 154(b) by 353 days.

(21) Appl. No.: 10/014,710

(22) Filed: Dec. 11, 2001

Related U.S. Application Data

(63) Continuation-in-part of application No. 09/662,579, filed on Sep. 14, 2000, now abandoned.

(51) Int. Cl.⁷ .......................... C08G 63/34; C09D 11/10
(52) U.S. Cl. .................... 528/339.5; 523/160; 524/607; 525/54.44; 525/183; 528/345
(58) Field of Search .............. 528/339.5, 345; 525/54.44, 183; 523/160; 524/607

(56) References Cited

U.S. PATENT DOCUMENTS

| | | | |
|---|---|---|---|
| 3,412,115 A | 11/1968 | Floyd et al. | |
| 3,778,394 A | 12/1973 | Lovald et al. | |
| RE28,533 E | 8/1975 | Drawert et al. | |
| 4,111,877 A | 9/1978 | Dixon et al. | |
| 4,487,940 A | 12/1984 | Sekmakas et al. | |
| 4,526,915 A | 7/1985 | Sekmakas et al. | |
| 4,870,139 A | 9/1989 | Kveglis et al. | |
| 5,026,755 A | 6/1991 | Kveglis et al. | |
| 5,180,782 A | 1/1993 | Stone et al. | |
| 5,183,847 A | 2/1993 | El-Hefnawi et al. | |
| 5,420,229 A | 5/1995 | Burke et al. | |
| 5,656,679 A | 8/1997 | Hutter | |
| 5,693,702 A | 12/1997 | Hutter | |
| 6,069,275 A | 5/2000 | Shachat et al. | |
| 6,437,037 B1 * | 8/2002 | Hutter ......................... | 524/460 |
| 6,620,770 B1 * | 9/2003 | Kirsner et al. ............... | 507/131 |

FOREIGN PATENT DOCUMENTS

GB 1236088 2/1972

OTHER PUBLICATIONS

U.S. patent application Ser. No. 09/661,278, Hutter, filed Sep. 2000.
Halbrook, N. J., R. V. Lawrence, R. L. Dressler, R. C. Blackstone, and W. Herz. Structure and Stereochemistry of Diels–Alder Adducts of Levopimaric Acid. *Journal of Organic Chemistry* vol. 29: 1017–1021. 1964.

* cited by examiner

Primary Examiner—Tae H. Yoon
(74) Attorney, Agent, or Firm—Daniel B. Reece IV; Terry B. McDaniel

(57) ABSTRACT

This invention concerns novel rosin-fatty acid vinylic polyamide polymer resin compositions and the process for preparing them. More particularly, the invention concerns novel rosin-fatty acid vinylic polyamide graft polymer compositions that exhibit properties that make them useful as resins for improving the adhesion of water-based inks and coatings to plastic substrates.

20 Claims, No Drawings

ROSIN-FATTY ACID VINYLIC POLYAMIDE POLYMER RESINS

This application is a continuation-in-part of our commonly assigned, U.S. patent application Ser. No. 09/662,579 filed Sep. 14, 2000 now abandoned, entitled "Rosin-Fatty Acid Vinylic Polyamide Polymer Resins".

FIELD OF INVENTION

This invention concerns novel rosin-fatty acid vinylic polyamide polymer resin compositions and the process for preparing them. More particularly, the invention concerns novel rosin-fatty acid vinylic polyamide graft polymer compositions that exhibit properties that make them useful as resins for improving the adhesion of water-based inks and coatings to plastic substrates.

BACKGROUND OF THE INVENTION

Gravure and flexographic printing methods are widely used in the packaging industry for applying decorative and informative graphics to various substrates, particularly paper, board, metal foils, and plastic films. The inks traditionally used in these printing processes typically consist of a pigment dispersed in a liquid vehicle, which itself comprises a resin dissolved in an organic solvent.

In recent years, much of the packaging printing on paper and board substrates has switched from these solvent-based inks to more environmentally friendly water-based ones, where the vehicle comprises an aqueous solution or dispersion of resin. Conversion of inks for plastic films to aqueous vehicles has, however, been retarded by the poor adhesion of most water-based resins to these substrates.

One of the most widely used classes of resins in solvent-based inks for plastic films is polyamides, particularly dimer acid-based polyamides, such as the VERSAMID resins manufactured by Henkel Corporation. These polyamides provide excellent adhesion to such films as corona-treated polyethylene and polypropylene. Therefore, attempts have been made in the past to modify polyamide resins to make them water-dispersible, with the expectation that such modified polyamides would provide aqueous inks with good adhesion to plastic films. For example, U.S. Pat. Nos. 4,870,139 and 5,026,755 teach the graft polymerization of acrylic monomers onto polyamides in high solids alcohol solutions. The resulting solutions of graft copolymers are then mixed with water and amines to form aqueous ink vehicles. A problem with this method is that a considerable amount of alcohol remains in the finished ink. It would be most desirable from an environmental point of view to have no solvent of any kind in the finished ink.

U.S. Pat. No. 5,183,847 teaches the production of graft copolymers by fusing together at high temperature a maleated rosin, a polyamide resin, and an acrylic resin. This method produces an amide-containing resin that can be readily dispersed in aqueous ammonia without the need for any organic cosolvent. However, the method is relatively expensive and time-consuming, being what is known in the art as a "three-pot" procedure. That is, the method requires the separate manufacture of both the acrylic and the polyamide resin, which are subsequently reacted with the maleated rosin to produce the graft copolymers.

Therefore, an object of this invention is to solve these major problems by disclosing a method of producing rosin-fatty acid vinylic polyamide graft polymer compositions that exhibit properties that make them useful as resins in water-based ink, overprint, and other coating formulations.

Another object of this invention is to disclose rosin-fatty acid vinylic polyamide graft polymer resin compositions.

SUMMARY OF THE INVENTION

The objects of this invention are met via the process of: (a) forming a vinylic resin in the presence of a mixture of unsaturated fatty acid and rosin, (b) adducting the rosin fatty acid vinylic mixture in the same reactor, and (c) adding a pre-formed polyamide resin and fusing it with the adducted rosin-fatty acid vinylic resin mixture to produce the rosin-fatty acid vinylic polyamide graft polymer compositions which are useful as resins in water-based ink, overprint varnishes, and other coating applications.

The process is a relatively economical "two-pot" procedure where only the polyamide has to be pre-manufactured. Moreover, the process employs rosin and fatty acid to act as solvents in the polymerization reaction of the acrylic monomers. As this method does not require the use of organic solvents, the need for solvent stripping is eliminated. Also, the polymerization reaction can be conducted at higher temperatures (i.e., up to boiling point of fatty acid) than traditional solution polymer methods, thereby allowing the practitioner to utilize smaller amounts of free radical initiators. Furthermore, the practitioner is able to regulate molecular weight without the use of chain transfer agents, thereby both reducing costs and avoiding the production of unpleasant odors associated with such agents. Moreover, the fatty acid and rosin can function as a reactive diluent to impart flexibility to the resin composition. Finally, the incorporation by grafting of fatty acid residues onto the resulting resin compositions serves to enhance the adhesion of the resins to plastic substrates.

DESCRIPTION OF THE PREFERRED EMBODIMENT

The rosin-fatty acid vinylic polyamide polymer resin compositions are the products of the process of:

(A) reacting in an addition polymerization reaction:
  (1) about 20.0% to about 60.0% by total weight of the reactants of a fatty acid rosin mixture comprising:
     (a) about 10.0% to about 90.0% by total weight of the fatty acid rosin mixture of unsaturated fatty acid, and
     (b) about 10.0% to about 90.0% by total weight of the fatty acid rosin mixture of rosin; and
  (2) about 40.0% to about 80.0% by total weight of the reactants of a monomer mixture comprising:
     (a) about 15.0% to about 45.0% by total weight of the monomer mixture of a member selected from the group consisting of acrylic acid, methacrylic acid, and combinations thereof,
     (b) about 55.0% to about 85.0% by total weight of the monomer mixture of non-carboxylic acid containing vinylic monomer,
     (c) about 0.5% to about 5.0% by total weight of the monomer mixture of polymerization initiator, and
     (d) up to about 4.0% by total weight of the monomer mixture of chain transfer agent, at a temperature in the range of about 135° C. to about 175° C. to produce a rosin-fatty acid vinylic polymer having a weight average molecular weight in the range of about 4,000 to about 12,000;

(B) reacting in an "ene" or Diels-Alder adduction reaction:
  (1) about 88.0% to about 99.5% by total weight of the reactants of rosin-fatty acid vinylic polymer, and (2) about 0.5% to about 12.0% by total weight of the reactants of a member selected from the group consisting of α,β-unsaturated carboxylic acids, α,β-unsaturated carboxylic anhydrides, and combinations thereof at a temperature in the range of about 170° C. to about 240° C. to produce an adducted rosin fatty acid vinylic polymer;

(C) reacting in a condensation polymerization reaction:
(1) about 65.0% to about 95.0% by total weight of the reactants of the adducted rosin fatty acid vinylic polymer, and
(2) about 5.0% to about 35.0% by total weight of the reactants of dimer acid-based polyamide resin at a temperature in the range of about 200° C. to about 280° C.;

to produce the rosin-fatty acid vinylic polyamide polymer resin compositions.

Preferred rosin-fatty acid vinylic polyamide polymer resin compositions are the products of the process of:

(A) reacting in an addition polymerization reaction:
(1) about 20.0% to about 60.0% by total weight of the reactants of a fatty acid rosin mixture comprising:
(a) about 20.0% to about 50.0% by total weight of the fatty acid rosin mixture of unsaturated fatty acid, and
(b) about 50.0% to about 80.0% by total weight of the fatty acid rosin mixture of rosin; and
(2) about 40.0% to about 80.0% by total weight of the reactants of a monomer mixture comprising:
(a) about 20.0% to about 25.0% by total weight of the monomer mixture of a member selected from the group consisting of acrylic acid, methacrylic acid, and combinations thereof,
(b) about 60.0% to about 70.0% by total weight of the monomer mixture of non-carboxylic acid containing vinylic monomer,
(c) about 1.0% to about 3.0% by total weight of the monomer mixture of polymerization initiator, and
(d) about 0.5% to about 2.0% by total weight of the monomer mixture of chain transfer agent, at a temperature in the range of about 140° C. to about 170° C. to produce a rosin-fatty acid vinylic polymer having a weight average molecular weight in the range of about 5,000 to about 11,000;

(B) reacting in an "ene" or Diels-Alder adduction reaction:
(1) about 92.0% to about 98.0% by total weight of the reactants of rosin-fatty acid vinylic polymer, and
(2) about 2.0% to about 8.0% by total weight of the reactants of a member selected from the group consisting of α,β-unsaturated carboxylic acids, α,β-unsaturated carboxylic anhydrides, and combinations thereof at a temperature in the range of about 180° C. to about 220° C. to produce an adducted rosin fatty acid vinylic polymer;

(C) reacting in a condensation polymerization reaction:
(1) about 75.0% to about 90.0% by total weight of the reactants of the adducted rosin fatty acid vinylic polymer, and
(2) about 10.0% to about 25.0% by total weight of the reactants of dimer acidbased polyamide resin at a temperature in the range of about 220° C. to about 260° C.;

to produce the rosin-fatty acid vinylic polyarnide polymer resin compositions.

The addition polymerization reaction used to produce the rosin-fatty acid vinylic polymer is a melt polymerization reaction in which no water is employed. Reaction temperatures suitable for use in the present method are within the range of about 135° C. to about 175° C.; with the preferred temperatures being in the range of about 140° C. to about 170° C.

The rosin and fatty acid function as solvents in the polymerization reaction of the acrylic monomers. Additionally, while a portion of the fatty acid and the rosin component remains unreacted, some of the fatty acid and rosin becomes graft polymerized onto the acrylic. The resulting rosin-fatty acid vinylic polymers have a weight average molecular weight in the range of about 4,000 to about 12,000; with the preferred molecular weights being in the range of about 5,000 to about 1,000.

Fatty acids that are suitable for use in the present method include those unsaturated fatty acids that contain a range of carbon atoms from about $C_{12}$ to about $C_{24}$, with the preferred range being from about $C_{16}$ to $C_{20}$. It is further preferred that the unsaturated fatty acid be vegetable or tall oil based. It is most preferred that the unsaturated fatty acid be tall oil based and contain from about 15% to about 18% conjugated double bonds.

The unsaturated fatty acid component comprises from about 10% to about 90% of the total weight of the fatty acid rosin mixture, with the preferred amount being from about 20% to about 50%.

The rosin component comprises from about 10% to about 90% of the total weight of the fatty acid rosin mixture, with the preferred amount being from about 50% to about 80%. Rosins that are preferred for use in the present method include wood rosin, tall oil rosin, gum rosin, and the like. It is further preferred to use tall oil rosin.

From about 15% to about 45% by total weight of the monomer mixture is a member selected from the group consisting of acrylic acid, methacrylic acid, and combinations thereof. The preferred range of this component is from about 20% to about 25%.

From about 55% to about 85% by total weight of the monomer mixture is a non-carboxylic acid containing vinylic monomer or combination of a non-carboxylic acid containing vinylic monomers. The preferred range of this component is from about 60% to about 70%. Preferred non-carboxylic acid containing vinylic monomers include styrenic monomers, acrylic monomers, methacrylic monomers, and the like. Where desired, the non-carboxylic acid containing vinylic monomer component can be a mixture, preferably including at least one monoalkenyl aromatic monomer and at least one acrylic monomer. Suitable monoalkenyl aromatic monomers include, but are not limited to, the following: alpha-methyl styrene, styrene, vinyl toluene, tertiary butyl styrene, ortho-chlorostyrene, and mixtures thereof.

The term "acrylic monomer" as employed herein includes acrylic or methacrylic acid, esters of acrylic or methacrylic acid and derivatives and mixtures thereof. Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, trifluoroethyl methacrylate, glycidyl methacrylate, benzyl methacrylate, allyl methacrylate, 2-n- butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, frryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfiryl methacrylate and tetrahydropyranyl methacrylate.

Other suitable acrylic monomers include methacrylic acid derivatives such as methacrylonitrile, methacrylamide, N-methylmethacrylamide, N-ethylmethacrylamide, N,N-diethymethacrylamide, N,N-dimethyl-methacrylamide, N-phenyl-methacrylamide, methacrolein, and the like.

Acrylate esters suitable for use in the present method include methyl acrylate, ethyl acrylate, n-propyl acrylate, isopropyl acrylate, n-butyl acrylate, n-decyl acrylate, 2-ethylhexyl acrylate, and the like.

Acrylic acid derivatives suitable for employment as the acrylic monomer include acrylonitrile, acrylamide, methyl alpha-chloroacrylate, methyl 2-cyanoacrylate, N-ethylacrylamide, N,N-diethylacrylamide, acrolein, and the like.

The present invention method is also applied to the preparation of copolymers from mixtures of two or more acrylic monomers such as termonomers and tetrarnonomers. It is also contemplated that mixtures of at least one acrylic monomer and at least one non-acrylic ethylenic monomer may be polymerized with monoalkenyl aromatic monomers in accordance with the present method.

Ethylenic monomers suitable for use in the present method include vinylpyridine, vinylpyrollidone, methyl crotonate, crotonic acid, maleic anhydride, and the like.

The type of polymerization initiator suitable for use in the present method is known in the art to depend upon the desired temperature for the reaction. Suitable initiators include, but are not limited to, the following: t-butyl peroxide, t-butyl peroxybenzoate, t-butyl peroctoate, cumene hydroperoxide, azobisisobutyronitrile, benzoyl peroxide, and combinations thereof. The polymerization initiator comprises from about 0.5% to about 5.0% by total weight of the monomer mixture, with the preferred amount being in the range of about 1.0% to about 3.0%.

Where desired, a chain transfer agent may be employed in the present method. Chain transfer agents that are suitable for use in the above reaction include, but are not limited to, the following: dodecyl mercaptan, mercaptoacetic acid, mercaptopropionic acid, octyl mercaptan, 2-mercaptoethanol, and combinations thereof. When employed, it is preferred to use an amount of chain transfer agent in the range of from about 0.5% to about 2.0% by total F weight of the monomer mixture of chain transfer agent, but up to about 4.0% may be utilized.

It is preferred to employ a bulk polymerization process for the addition polymerization reaction. The residence time for such bulk processes is commonly in the range of about 3 hours to about 10 hours.

From about 0.5% to about 12.0% by total weight of the reactants in the "ene" or Diels-Alder adduction reaction are members selected from the group consisting of a,unsaturated carboxylic acids, α,β-unsaturated carboxylic anhydrides, and combinations thereof. The preferred amount of these reactants is from about 2% to about 8%. Examples of a,unsaturated carboxylic acids and anhydrides which are preferred for use in the present method include maleic acid, maleic anhydride, fumaric acid, acrylic acid, methacrylic acid, itaconic acid, itaconic anhydride, and the like. It is further preferred to utilize maleic anhydride and/or fumaric acid. The "ene" or Diels-Alder adduction reaction is carried out at a temperature in the range of from about 1700 to about 240°, preferably from about 180° to about 220° C., for a period of time sufficient of the reaction to occur (normally from about one to five hours).

The dimer acid-based polyamide resin component comprises from about 5% to about 35% of the reactants in the condensation polymerization reaction, with the preferred amount being from about 10% to about 25%. Examples of polyamides which are suitable for use in the present method include those which are made by the well-known condensation polymerization of dimerized fatty acids with diamines, such as the polyamides disclosed in British Patent No. 1,236,088 and U.S. Pat. Nos. 3,412,115; 3,778,394, and Re. 28,533 (which are hereby incorporated by reference) and the like. Suitable commercially available polyamides include VERSAMID and MACROMELT (dimer-acid based polyamides manufactured by the Henkel Corporation).

Aqueous varnishes suitable for use in formulating ink vehicles can be produced by mixing aqueous solutions of the rosin-fatty acid vinylic polyamide polymer resin compositions with organic or inorganic bases. Preferred bases include ammonia, water-soluble amines, water-soluble alkanolamines, alkali metal hydroxides, alkali metal carbonates, and the like.

Ink vehicles can be formulated by mixing aqueous varnishes that contain the rosin-fatty acid vinylic polyamide polymer resin compositions with a member selected from the group consisting of acrylic latices, styrenic latices, and combinations thereof. Water-based inks can be formulated by mixing the said ink vehicles with aqueous pigment dispersions. It is well within the ability of one skilled in the art to employ the rosin-fatty acid vinylic polyamide polymer resin compositions taught herein to produce such varnishes, vehicles, and inks.

The following examples are provided to further illustrate the present invention and are not to be construed as limiting the invention in any manner. In the examples all parts are given by weight.

EXAMPLE 1

A rosin-fatty acid vinylic polyamide polymer resin composition was prepared via the following method. A reactor vessel equipped with a thermometer, stirrer, monomer feed pump, and a blanket nitrogen intake line was charged at room temperature with a mixture of 20 parts of L-5 Fatty Acid (a tall oil fatty acid composition commercially available from Westvaco Corporation) and 20 parts of Rosin SS (a tall oil rosin composition commercially available from Westvaco Corporation). The mixture was heated under a nitrogen blanket to 145° C. and held at that temperature, whereupon Charge A was added, with stirring, over a three-hour period. Charge A consisted of a mixture of 18.3 parts of styrene, 18.3 parts of a-methylstyrene, 21.2 parts of acrylic acid, and 2.23 parts of di-tert-butyl peroxide. After the addition of Charge A was completed, the reaction mixture was heated to 180° C. and held for one hour. At that time 3.9 parts of maleic anhydride was added and the reaction temperature was increased to 200° C. After one hour, 17.1 parts of VERSAMID 754 (a dimer acid-based polyamide commercially available from the Henkel Corporation) was added, the reaction temperature was increased to 230° C. and held for two hours. The resulting rosin-fatty acid vinylic polyamide polymer resin composition (hereafter referred to as "Resin No. 1") was a solid resin having an acid number of 198 and a ring and ball softening point of 121° C.

EXAMPLE 2

A rosin-fatty acid vinylic polyamide polymer resin composition was prepared via the following method. A reactor vessel equipped with a thermometer, stirrer, monomer feed pump, and a blanket nitrogen intake line was charged at room temperature with a mixture of 20 parts of L-5 Fatty Acid (a tall oil fatty acid composition commercially available from Westvaco Corporation) and 20 parts of Rosin SS (a tall oil rosin composition commercially available from Westvaco Corporation). The mixture was heated under a nitrogen blanket to 145° C. and held at that temperature, whereupon Charge A was added, with stirring, over a three-hour period. Charge A consisted of a mixture of 18.3 parts of styrene, 18.3 parts of (x-methylstyrene, 21.2 parts of acrylic acid, and 2.23 parts of di-tert-butyl peroxide. After the addition of Charge A was completed, the reaction mixture was heated to 180° C. and held for one hour. At that time 3.9 parts of fumaric acid was added and the reaction temperature was increased to 200° C. After one hour, 17.1 parts of VERSAMID 754 (a dimer acid-based polyamide commercially available from the Henkel Corporation) was added, the reaction temperature was increased to 230° C. and held for two hours. The resulting rosin-fatty acid vinylic polyamide polymer resin composition (hereafter referred to as "Resin No. 2") was a solid resin having an acid number of 199 and a ring and ball softening point of 127° C.

EXAMPLE 3

A rosin-fatty acid vinylic polyamide polymer resin composition was prepared via the following method. A reactor vessel equipped with a thermometer, stirrer, monomer feed pump, and a blanket nitrogen intake line was charged at room temperature with a mixture of 20 parts of L-5 Fatty Acid (a tall oil fatty acid composition commercially available from Westvaco Corporation) and 20 parts of ww gum rosin. The mixture was heated under a nitrogen blanket to 145° C. and held at that temperature, whereupon Charge A was added, with stirring, over a three-hour period. Charge A consisted of a mixture of 18.3 parts of styrene, 18.3 parts of α-methylstyrene, 21.2 parts of acrylic acid, and 2.23 parts of di-tert-butyl peroxide. After the addition of Charge A was completed, the reaction mixture was heated to 180° C. and held for one hour. At that time 3.9 parts of fumaric acid was added and the reaction temperature was increased to 200° C. After one hour, 17.1 parts of VERSAMID 754 (a dimer acid-based polyamide commercially available from the Henkel Corporation) was added, the reaction temperature was increased to 230° C. and held for two hours. The resulting rosin-fatty acid vinylic polyamide polymer resin composition (hereafter referred to as "Resin No. 3") was a solid resin having an acid number of 196 and a ring and ball softening point of 135° C.

EXAMPLE 4

A rosin-fatty acid vinylic polyamide polymer composition was prepared via the following method. A reactor vessel equipped with a thermometer, stirrer, monomer feed pump, and a blanket nitrogen intake line was charged at room temperature with a mixture of 20 parts of L-5 Fatty Acid (a tall oil fatty acid composition commercially available from Westvaco Corporation) and 20 parts of Rosin SS (a tall oil rosin composition commercially available from Westvaco Corporation). The mixture was heated under a nitrogen blanket to 145° C. and held at that temperature, whereupon Charge A was added, with stirring, over a three-hour period. Charge A consisted of a mixture of 18.3 parts of styrene, 18.3 parts of a-methylstyrene, 21.2 parts of acrylic acid, and 2.23 parts of di-tert-butyl peroxide. After the addition of Charge A was completed, the reaction mixture was heated to 180° C. and held for one hour. At that time 3.9 parts of maleic anhydride was added and the reaction temperature was increased to 200° C. After one hour, 17.1 parts of MACROMELT 6240 (a dimer acid-based polyamide commercially available from the Henkel Corporation) was added, the reaction temperature was increased to 230° C. and held for two hours. The resulting rosin-fatty acid vinylic polyamide polymer resin composition (hereafter referred to as "Resin No. 4") was a solid resin having an acid number of 210 and a ring and ball softening point of 132° C.

EXAMPLE 5

An aqueous varnish was prepared by mixing a 25% solution of Resin No. 1 in aqueous ammonia with JONREZ E-2050 (an acrylic polymer latex commercially available from the Westvaco Corporation) at a ratio of 1:4 based on resin solids. A blue laminating ink was prepared from this varnish by mixing 52 parts of the varnish with 13 parts of isopropyl alcohol and 35 parts of FLEXIVERSE BFD-1121 base (a phthalocyanine blue pigment dispersion commercially available from Sun Chemical Corporation). The ink was drawn down with a number 7 wire-wound rod on Mobil LCM treated polypropylene film, and the drawdown was dried for 20 seconds at 80° C. The dried ink film showed excellent block resistance. Another drawdown was subsequently coated with Morton laminating adhesive 77T634 (an aqueous urethane adhesive commercially available from Morton Chemical) and dried for 20 seconds at 80° C. A sheet of polyester film was laid against the dried adhesive and the resulting sandwich was heat-sealed in a Sentenel heat sealer for five seconds at 250° F. and 60 psi to produce a laminate. The laminate exhibited an excellent peel strength of 73 grams/inch.

EXAMPLE 6

An aqueous varnish was prepared by mixing a 25% solution of Resin No. 4 in aqueous ammonia with JONREZ E-2050 (an acrylic polymer latex commercially available from the Westvaco Corporation) at a ratio of 1:4 based on resin solids. A blue laminating ink was prepared from this varnish by mixing 52 parts of the varnish with 13 parts of isopropyl alcohol and 35 parts of FLEXIVERSE BFD-1121 base (a phthalocyanine blue pigment dispersion commercially available from the Sun Chemical Corporation). The ink was drawn down with a number 7 wire-wound rod on Mobil LCM treated polypropylene film, and the drawdown was dried for 20 seconds at 80° C. The dried ink film showed excellent block resistance. Another drawdown was subsequently coated with Morton laminating adhesive 77T634 (an aqueous urethane adhesive commercially available from Morton Chemical) and dried for 20 seconds at 80° C. A sheet of polyester film was laid against the dried adhesive and the resulting sandwich was heat-sealed in a Sentenel heat sealer for five seconds at 250° F. and 60 psi to produce a laminate. The ink had superior block resistance, and the laminate had an excellent peel strength of 88 grams/inch.

EXAMPLE 7

A series of aqueous varnishes were prepared by mixing a 25% solution of the Resin Nos. 1, 2, and 4 in aqueous ammonia with JONREZ E-2050 (an acrylic polymer latex commercially available from the Westvaco Corporation) at a ratio of 1:4 based on resin solids. A white laminating ink was prepared from each aqueous varnish by mixing 40 parts of varnish with 5 parts isopropyl alcohol, 5 parts deionized water and 50 parts white pigment dispersion. (The white pigment dispersion was made from 65 parts titanium dioxide pigment, 3 parts 28% aqueous ammonia, 3 parts MOREZ 101 (an acrylic resin commercially available from Rohm and Haas Company), 19 parts deionized water, and 6 parts isopropanol.)

The resulting inks were cut to a viscosity of 20±2 seconds as measured with a #2 Zahn cup and applied to corona-treated polyethylene film with a flexo hand proofer equipped with a 165-line quad cylinder. After drying for 5 minutes at room temperature, inks made in this manner from the resins of Examples 1, 2, and 4 all exhibited 10.0% adhesion as measured by the commonly used Scotch tape pull test.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A rosin-fatty acid vinylic polyamide polymer resin composition comprising the reaction product prepared by:
   (A) reacting in an addition polymerization reaction:
      (1) about 20.0% to about 60.0% by total weight of the reactants of a fatty acid rosin mixture comprising:
         (a) about 10.0% to about 90.0% by total weight of the fatty acid rosin mixture of unsaturated fatty acid, and
         (b) about 10.0% to about 90.0% by total weight of the fatty acid rosin mixture of rosin; and
      (2) about 40.0% to about 80.0% by total weight of the reactants of a monomer mixture comprising:
         (a) about 15.0% to about 45.0% by total weight of the monomer mixture of a member selected from the group consisting of acrylic acid, methacrylic acid, and combinations thereof,
         (b) about 55.0% to about 85.0% by total weight of the monomer mixture of non-carboxylic acid containing vinylic monomer,
         (c) about 0.5% to about 5.0% by total weight of the monomer mixture of polymerization initiator, and
         (d) up to about 4.0% by total weight of the monomer mixture of chain transfer agent, at a temperature in the range of about 135° C. to about 175° C. to produce a rosin-fatty acid vinylic polymer having a weight average molecular weight in the range of about 4,000 to about 12,000;
   (B) reacting in an "ene" or Diels-Alder adduction reaction:
      (1) about 88.0% to about 99.5% by total weight of the reactants of rosin-fatty acid vinylic polymer, and
      (2) about 0.5% to about 12.0% by total weight of the reactants of a member selected from the group consisting of α,β-unsaturated carboxylic acids, α,β-unsaturated carboxylic anhydrides, and combinations thereof at a temperature in the range of about 170° C. to about 240° C. to produce an adducted rosin fatty acid vinylic polymer;
   (C) reacting in a condensation polymerization reaction:
      (1) about 65.0% to about 95.0% by total weight of the reactants of the adducted rosin fatty acid vinylic polymer, and
      (2) about 5.0% to about 35.0% by total weight of the reactants of dimer acid-based polyamide resin at a temperature in the range of about 200° C. to about 280° C.;
   to produce the rosin-fatty acid vinylic polyamide polymer resin composition.

2. The rosin-fatty acid vinylic polyamide polymer resin composition of claim 1 comprising the reaction product prepared by:
   (A) reacting in an addition polymerization reaction:
      (1) about 20.0% to about 60.0% by total weight of the reactants of a fatty acid rosin mixture comprising:
         (a) about 20.0% to about 50.0% by total weight of the fatty acid rosin mixture of unsaturated fatty acid, and
         (b) about 50.0% to about 80.0% by total weight of the fatty acid rosin mixture of rosin; and
      (2) about 40.0% to about 80.0% by total weight of the reactants of a monomer mixture comprising:
         (a) about 20.0% to about 25.0% by total weight of the monomer mixture of a member selected from the group consisting of acrylic acid, methacrylic acid, and combinations thereof,
         (b) about 60.0% to about 70.0% by total weight of the monomer mixture of non-carboxylic acid containing vinylic monomer,
         (c) about 1.0% to about 3.0% by total weight of the monomer mixture of polymerization initiator, and
         (d) about 0.5% to about 2.0% by total weight of the monomer mixture of chain transfer agent, at a temperature in the range of about 140° C. to about 170° C. to produce a rosin-fatty acid vinylic polymer having a weight average molecular weight in the range of about 5,000 to about 11,000;
   (B) reacting in an "ene" or Diels-Alder adduction reaction:
      (1) about 92.0% to about 98.0% by total weight of the reactants of rosin-fatty acid vinylic polymer, and
      (2) about 2.0% to about 8.0% by total weight of the reactants of a member selected from the group consisting of α,β-unsaturated carboxylic acids, α,β-unsaturated carboxylic anhydrides, and combinations thereof at a temperature in the range of about 180° C. to about 220° C. to produce an adducted rosin fatty acid vinylic polymer;
   (C) reacting in a condensation polymerization reaction:
      (1) about 75.0% to about 90.0% by total weight of the reactants of the adducted rosin fatty acid vinylic polymer, and
      (2) about 10.0% to about 25.0% by total weight of the reactants of dimer acidbased polyamide resin at a temperature in the range of about 220° C. to about 260° C.;
   to produce the rosin-fatty acid vinylic polyamide polymer resin composition.

3. The resin composition of claim 1 wherein the fatty acid is a member selected from the group consisting of unsaturated fatty acids containing from 12 to 24 carbon atoms and combinations thereof.

4. The resin composition of claim 3 wherein the fatty acid is tall oil based.

5. The resin composition of claim 1 wherein the rosin is a member selected from the group consisting of tall oil rosin, wood rosin, gum rosin, and combinations thereof.

6. The resin composition of claim 1 wherein the non-carboxylic acid containing vinylic monomer is a member selected from the group consisting of styrenic monomers, acrylic monomers, methacrylic monomers, and combinations thereof.

7. The resin composition of claim 6 wherein the non-carboxylic acid containing vinylic monomer is a mixture containing at least one monoalkenyl aromatic monomer and at least one acrylic monomer.

8. The resin composition of claim 7 wherein the monoalkenyl aromatic monomer is a member selected from the group consisting of alpha-methyl styrene, styrene, vinyl toluene, tertiary butyl styrene, ortho-chlorostyrene, and combinations thereof.

9. The resin composition of claim 6 wherein the acrylic monomer is a member selected from the group consisting of methyl methacrylate, ethyl methacrylate, n-propyl methacrylate, n-butyl methacrylate, isopropyl methacrylate, isobutylmethacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl thacrylate, 2-phenylethyl methacrylate, phenyl methacrylate, propargyl methacrylate, tetrahydrofurfuryl methacrylate, tetrahydropyranyl methacrylate, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, methyl acrylate, ethyl acrylate, n-propyl acrylate, isopropyl acrylate, n-butyl acrylate, n-decyl acrylate, acrylonitrile, acrylamide, methyl alpha-chloroacrylate, methyl 2-cyanoacrylate, N-ethylacrylamide, N,N-diethylacrylamide, acrolein, and combinations thereof.

10. The resin composition of claim 1 wherein the polymerization initiator is a member selected from the group consisting of t-butyl peroxide, t-butyl peroxybenzoate, t-butyl peroctoate, cumene hydroperoxide, azobisisobutyronitrile, benzoyl peroxide, and combinations thereof.

11. The resin composition of claim 1 wherein the chain transfer agent is a member selected from the group consisting of dodecyl mercaptan, mercaptoacetic acid, mercaptopropionic acid, octyl mercaptan, 2-mercaptoethanol, and combinations thereof.

12. The resin composition of claim 1 wherein the $\alpha,\beta$-unsaturated carboxylic acid is a member selected from the group consisting of maleic acid, fumaric acid, acrylic acid, methacrylic acid, itaconic acid, and combinations thereof.

13. The resin composition of claim 1 wherein the $\alpha,\beta$-unsaturated anhydride is a member selected from the group consisting of maleic anhydride, itaconic anhydride, and combinations thereof.

14. An aqueous varnish comprising an aqueous solution of the resin composition of claim 1 and a member selected from the group consisting of organic bases, inorganic bases, and combinations thereof.

15. The aqueous varnish of claim 14 wherein the base is a member selected from the group consisting of ammonia, water-soluble amines, water-soluble alkanolamines, alkali metal hydroxides, alkali metal carbonates, and combinations thereof.

16. An ink vehicle comprising the aqueous varnish of claim 15 and a member selected from the group consisting of acrylic latices, styrenic latices, and combinations thereof.

17. An ink comprising the ink vehicle of claim 16 and an aqueous pigment dispersion.

18. An aqueous varnish comprising an aqueous solution of the resin composition of claim 2 and a member selected from the group consisting of organic bases, inorganic bases, and combinations thereof.

19. An ink vehicle comprising the aqueous varnish of claim 18 and a member selected from the group consisting of acrylic latices, styrenic latices, and combinations thereof.

20. An ink comprising the ink vehicle of claim 19 and an aqueous pigment dispersion.

* * * * *

UNITED STATES PATENT AND TRADEMARK OFFICE
CERTIFICATE OF CORRECTION

PATENT NO.   : 6,734,280 B1
DATED        : May 11, 2004
INVENTOR(S)  : G. F. Hutter It is certified that error appears in the above-identified patent and that said Letters Patent is hereby corrected as shown below:

Column 3,
Line 63, delete "acidbased" and substitute therefor -- acid-based --.
Line 66, delete "polyarnide" and substitute therefor -- polyamide --.

Column 4,
Line 16, delete "1,000" and substitute therefor -- 11,000 --.

Column 5,
Line 5, delete "frryl" and substitute therefor -- furfuryl --.
Line 12, delete "tetrahydrofurfiryl" and substitute therefor -- tetrahydrofurfuryl --.
Line 31, delete "tetrarnonomers" and substitute therefor -- tetramonomers --.
Line 57, delete "F weight" and substitute therefor -- weight --.
Line 65, delete "a,unsaturated" and substitute therefor -- α,β-unsaturated --.

Column 6,
Line 2, delete "a,unsaturated" and substitute therefor -- α,β-unsaturated --.
Line 8, delete "1700" and substitute therefor -- 170° --.
Line 60, delete "a-methylstyrene," and substitute therefor -- α-methylstyrene, --.

Column 7,
Line 21, delete "x-methylstyrene," and substitute therefor -- α-methylstyrene, --.

Column 8,
Line 8, delete "a-methylstyrene," and substitute therefor -- α-methylstyrene, --.

Column 9,
Line 21, delete "10.0%" and substitute therefor -- 100% --.

Column 10,
Line 59, delete "acidbased" and substitute therefor -- acid-based --.

UNITED STATES PATENT AND TRADEMARK OFFICE
CERTIFICATE OF CORRECTION

PATENT NO.    : 6,734,280 B1
DATED         : May 11, 2004
INVENTOR(S)   : G. F. Hutter It is certified that error appears in the above-identified patent and that said Letters Patent is hereby corrected as shown below:

Column 11,
Line 24, delete "isobutylmethacrylate" and substitute therefor -- isobutyl methacrylate --.
Line 39, delete "thacrylate" and substitute therefor -- methacrylate --.

Signed and Sealed this

First Day of November, 2005

JON W. DUDAS
*Director of the United States Patent and Trademark Office*